US006284826B1

(12) United States Patent
Kinoshita et al.

(10) Patent No.: US 6,284,826 B1
(45) Date of Patent: Sep. 4, 2001

(54) STRIPPABLE PAINT AND SURFACE REGULATING AND RELEASE AGENTS FOR SAME PAINT

(75) Inventors: Keigo Kinoshita, Saitama; Kunio Oki, Tokyo; Akihide Katano; Tetsushi Sakaki, both of Kanagawa, all of (JP)

(73) Assignee: Nissan Motor Co. LTD, Kanagawa (JP)

( * ) Notice: Subject to any disclaimer, the term of this patent is extended or adjusted under 35 U.S.C. 154(b) by 0 days.

(21) Appl. No.: 09/515,857

(22) Filed: Feb. 29, 2000

(30) Foreign Application Priority Data

Mar. 1, 1999 (JP) .................................. 11-053146

(51) Int. Cl.$^7$ ..................................... C08K 5/06
(52) U.S. Cl. ....................................... 524/376; 427/407.1
(58) Field of Search ................................. 524/376

(56) References Cited

U.S. PATENT DOCUMENTS 5,145,518 * 9/1992 Winnik .................................... 106/21
5,242,623 * 9/1993 Morrison .............................. 252/512

OTHER PUBLICATIONS

JIS Handbook K 5400; Paints & Varnishes; Japanese Standards Association; 1996; 7 sheets (Translation Attached).

* cited by examiner

Primary Examiner—Paul R. Michl
(74) Attorney, Agent, or Firm—Foley & Lardner

(57) ABSTRACT

A strippable paint to be coated on a coating film of a real or permanent paint of an automotive vehicle body. The strippable paint comprises a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid. The acrylic copolymer resin particle is formed of acrylic copolymer having a chain structure including at least one of acrylic acid monomer and methacrylic acid monomer having ethylenic unsaturated bond and carboxyl group. The acrylic copolymer resin particle has an acid value of not lower than 90 and a glass transition temperature ranging from 25 to 40° C. Diethylene glycol monoether is contained in the nonaqueous dispersion type resinous liquid in an amount ranging from 7 to 13% by weight of a resinous solid content of the nonaqueous dispersion type resinous liquid. Additionally, polyether-chemically modified polysiloxane compound is contained in the nonaqueous dispersion type resinous liquid in an amount ranging from 0.5 to 2% by weight of the resin solid content of the nonaqueous dispersion type resinous liquid.

6 Claims, No Drawings

STRIPPABLE PAINT AND SURFACE REGULATING AND RELEASE AGENTS FOR SAME PAINT

BACKGROUND OF THE INVENTION

This invention relates to improvements in a strippable paint for temporarily protecting a paint coating film of an automotive vehicle and a surface of a variety of articles for the purpose of preventing degradation of an external appearance of the vehicle and the articles, and techniques for coating and releasing the strippable paint, and more particularly to the strippable paint which is excellent in external appearance and durability and readily releasable upon applying a release agent having a specified composition, a surface regulating agent for smoothing the coating film surface of the strippable paint so as to provide gloss to the coating film surface, and the release agent for making the coating film of the strippable paint water-soluble thereby facilitating release and removal of the strippable paint.

A temporary protective paint has been occasionally coated on a painted automotive vehicle body to be transferred between production steps and between factories, or on a complete automotive vehicle body to be transported from a dealer to a user, thereby preventing damage of a paint coating film of the automotive vehicle body. This is because there is the possibility of the paint coating film sustains damage so as to degrade the painted external appearance of the automotive vehicle body according to a circumstance where the automotive vehicle body resides. Such a temporary protective paint has been hitherto prepared as of a solvent-soluble resin type, a wax type, an aqueous type or a dispersion type, for the purpose of being applied onto the painted automotive vehicle body.

SUMMARY OF THE INVENTION

However, such a temporary protective paint is required to have a relatively good painted external appearance and a durability to at least rain, snow and dew condensation and to conditions occurred during cruising of the vehicle. On the other hand, the temporary protective paint is required to be finally readily released from the coating film surface of a real or permanent paint on which the temporary protective paint is coated. Thus, such contradictory characteristics are required to the temporary protective paint. Therefore, it has been very difficult to develop temporary protective paints having the contradictory characteristics.

For example, a temporary protective paint having an excellent releasable ability is high in durability under a standstill condition of the vehicle; however, such a temporary protective paint tends to be readily stripped during cruising of the vehicle. In contrast, a temporary protective paint having a high durability tends to be difficult to be stripped after the vehicle has been allowed to stand for a long time. Additionally, a development has been made to obtain a temporary protective paint formed of acrylic nonaqueous dispersion type resinous liquid and compulsorily releasable under the action of an alkaline solution. However, such a developed temporary protective paint is inferior in coating film performance and painted external appearance and in dynamic durability under conditions including vehicle cruising. Besides, alkaline compound is used in an operation for removing the temporary protective paint, and therefore a special waste water treating facility is required.

Therefore, it is an object of the present invention to provide an improved strippable paint, and new techniques for improving a coating film condition of the paint and a releasable ability of the paint, which can effectively overcome drawbacks encountered in conventional strippable paint and techniques for improving coating film conditions of the paints and releasable abilities of the paints.

Another object of the present invention is to provide an improved strippable paint which is excellent in painted external appearance, coated film performance and durability and is readily releasable and removable under the action of a release agent.

A further object of the present invention is to provide an improved surface regulating agent for a specified strippable paint, which can provide gloss to the coating film of the strippable paint upon smoothing the coating film surface in case that so-called "fog (shaded gloss)" is appeared at the coating film of the strippable paint owing to paint mist.

A still further object of the present invention is provide an improved release agent for a specified strippable paint, which can readily release the strippable paint from the surface of a painted article upon making the stoppable paint water-soluble, without requiring a special waste water treating facility.

An aspect of the present invention resides in a strippable paint comprising a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid. The copolymer resin particle is formed of acrylic copolymer having a chain structure including at least one of acrylic acid monomer and methacrylic acid monomer having ethylenic unsaturated bond and carboxyl group. The acrylic copolymer resin particle has an acid value of not lower than 90 and a glass transition temperature ranging from 25 to 40° C. Additionally, diethylene glycol monoether is contained in the nonaqueous dispersion type resinous liquid in an amount ranging from 7 to 13% by weight of a resinous solid content of the nonaqueous dispersion type resinous liquid. Further, polyether-chemically modified polysiloxane compound is contained in the nonaqueous dispersion type resinous liquid in an amount ranging from 0.5 to 2% by weight of the resin solid content of the nonaqueous dispersion type resinous liquid.

Another aspect of the present invention resides in a surface regulating agent to be used in combination with a strippable paint including a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid. The acrylic copolymer resin particle is formed of acrylic copolymer having a chain structure including at least one of acrylic acid monomer and methacrylic acid monomer having ethylenic unsaturated bond and carboxyl group. The acrylic copolymer resin particle has an acid value of not lower than 90 and a glass transition temperature ranging from 25 to 40° C. Diethylene glycol monoether is contained in the nonaqueous dispersion type resinous liquid in an amount ranging from 7 to 13% by weight of a resinous solid content of the nonaqueous dispersion type resinous liquid. Polyether-chemically modified polysiloxane compound is contained in the nonaqueous dispersion type resinous liquid in an amount ranging from 0.5 to 2% by weight of the resin solid content of the nonaqueous dispersion type resinous liquid. Here, the above-mentioned surface regulating agent comprises diacetone alcohol in an amount of not less than 90% by weight.

A further aspect of the present invention resides in a release agent to be used in combination with a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid. The acrylic copolymer resin particle is formed of acrylic copolymer having a chain structure including at least one of acrylic acid monomer and methacrylic acid monomer having ethylenic unsaturated bond and carboxyl group. The acrylic copolymer resin particle has an acid value of not lower than 90 and a glass transition temperature ranging from 25 to 40° C. Diethylene glycol monoether is contained in the nonaqueous dispersion type resinous liquid in an amount ranging from 7 to 13% by weight of a resinous solid content of the nonaqueous dispersion type resinous liquid. Polyether-chemically modified polysiloxane compound is contained in the nonaqueous dispersion type resinous liquid in an amount ranging from 0.5 to 2% by weight of the resin solid content of the nonaqueous dispersion type resinous liquid. Here, the release agent comprises water, sodium metasilicate in an amount ranging from 2 to 5% by weight, and hydroxyethyl cellulose in an amount of 1 to 3% by weight.

A still further aspect of the present invention resides in a method of temporarily protecting a surface of an article, comprising: (a) preparing a strippable paint including a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid, the acrylic copolymer resin particle being formed of acrylic copolymer having a chain structure including at least one of acrylic acid monomer and methacrylic acid monomer having ethylenic unsaturated bond and carboxyl group, the acrylic copolymer resin particle having an acid value of not lower than 90 and a glass transition temperature ranging from 25 to 40° C.; diethylene glycol monoether contained in the nonaqueous dispersion type resinous liquid in an amount ranging from 7 to 13% by weight of a resinous solid content of the nonaqueous dispersion type resinous liquid; and polyether-chemically modified polysiloxane compound contained in the nonaqueous dispersion type resinous liquid in an amount ranging from 0.5 to 2% by weight of the resin solid content of the nonaqueous dispersion type resinous liquid; (b) coating the strippable paint on the surface of the article for the purpose of temporarily protecting the surface of the article; (c) coating a release agent on the strippable paint coated on the surface of the article, the release agent including water, sodium metasilicate in an amount ranging from 2 to 5% by weight, and hydroxyethyl cellulose in an amount of 1 to 3% by weight; and (d) washing away the strippable paint together with the release agent with water so as to expose the surface of the article.

DETAILED DESCRIPTION OF THE INVENTION

According to the present invention, a strippable paint comprising a nonaqueous dispersion type resinous liquid including a solvent containing aromatic hydrocarbon in an amount ranging from 30 to 45% by weight relative to the solvent, and acrylic copolymer resin particle dispersed in the solvent in an amount ranging from 20 to 30% by weight relative to the nonaqueous dispersion type resinous liquid. The acrylic copolymer resin particle is formed of acrylic copolymer having a chain structure including at least one of acrylic acid monomer and methacrylic acid monomer having ethylenic unsaturated bond and carboxyl group. The acrylic copolymer resin particle has an acid value of not lower than 90 and a glass transition temperature ranging from 25 to 40° C. Additionally, diethylene glycol monoether is contained in the nonaqueous dispersion type resinous liquid in an amount ranging from 7 to 13% by weight of a resinous solid content of the nonaqueous dispersion type resinous liquid. Further, polyether-chemically modified polysiloxane compound is contained in the nonaqueous dispersion type resinous liquid in an amount ranging from 0.5 to 2% by weight of the resinous solid content of the nonaqueous dispersion type resinous liquid.

The nonaqueous dispersion type resinous liquid is prepared by dispersing the acrylic copolymer resin particle in a solvent containing aromatic hydrocarbon(s) in an amount ranging from 30 to 45% by weight relative to the solvent. The acrylic copolymer resin particle is formed of acrylic copolymer having the chain (linkage) structure which includes acrylic acid monomer and/or methacrylic acid monomer. Thus, acrylic acid and/or methacrylic acid having carboxyl group (—COOH) are bonded to the chain structure of the acrylic copolymer produced from acrylic monomers having ethylenic unsaturated bond. The acrylic copolymer serves as the main ingredient of a coating film of the strippable paint. Additionally, at least one of diethylene glycol monoethers serving as a film forming assistant and polyether-chemically modified polysiloxane compound serving as a slipping agent are mixed in the above-mentioned nonaqueous dispersion type resinous liquid.

Examples of the acrylic monomers from which the acrylic copolymer is produced are methyl methacrylate, ethyl methacrylate, butyl methacrylate, ethyl acrylate, butyl acrylate, stylene and the like. The blended ratio of the acrylic monomers and/or the content of acrylic acid monomer and/or methacrylic acid monomer are controlled so as to regulate the acid value at a value of not lower than 90 and the glass transition temperature at a value ranging from 25 to 40° C. Preferably, the content of acrylic acid monomer and/or methacrylic acid monomer in the acrylic copolymer resin particle is within a range of from 10 to 25% by weight. Concerning the acid value of the acrylic copolymer resin particle, if it is lower than 90, a good releasable ability for the strippable paint cannot be obtained when a release agent (discussed after) is applied. Concerning the glass transition temperature, if it is lower than 25° C., the coating film of the strippable paint is softened so as to be degraded in water resistance. If the glass transition temperature is higher that 40° C., the coating film becomes too hard so as to tend to be cracked while gloss of the coating film is lost.

The solvent in the nonaqueous dispersion type resinous liquid serves as a dispersion medium and is required to be low in dissolving ability so as not to dissolve the acrylic copolymer resin particle dispersed in the solvent and so as not to affect or damage the coating film of a paint (real or permanent paint on which the strippable paint is coated). The solvent is a mixture (petroleum solvent) of aliphatic hydrocarbon having chain structure and aromatic hydrocarbon having cyclic structure, in which the mixture is relatively low in content of aromatic hydrocarbon so as to be relatively low in dissolving ability. In this regard, it is preferable that the content of aromatic hydrocarbon in the solvent is within a range of from 30 to 45% by weight.

Additionally, the solvent preferably has an aniline point ranging from 35 to 45° C. An example of the solvent is a mixture of "LAWS Mineral Spirit (the trade name of Shell Japan Co., Ltd.)" and "Solveso 100 (the trade name of Shell Japan Co., Ltd.), in which they are so mixed that the content of aromatic hydrocarbon and the aniline point fall respectively within the above-mentioned ranges. The "LAWS Mineral Spirit" has a boiling point ranging from 150 to 205° C., an aromatic hydrocarbon content of about 30%, and an aniline point ranging from 40 to 46° C. The "Solveso 100" has a boiling point ranging from 160 to 180° C., an aromatic hydrocarbon content of not less than about 90%, and a mixed aniline point of about 13° C. Additionally, the solvent may be a mixture prepared by mixing toluene and/or xylene with isoparaffin aliphatic hydrocarbon(s).

The acrylic copolymer resin particle is dispersed in the solvent having the low aromatic hydrocarbon content, in the amount (content) ranging from 20 to 30% by weight so as to form the nonaqueous dispersion type resinous liquid. The amount of the acrylic copolymer resin particle to be dispersed is required from the viewpoint of obtaining a good paintability for the strippable paint. Specifically, if the content of the acrylic copolymer resin particle is less than 20% by weight, the strippable paint tends to easily drop so as to make it difficult to obtain the coating film having a certain thickness. If the content exceeds 30% by weight, spayed particles of the strippable paint cannot become sufficiently fine so as to make it possible to obtain a smooth surface of the coating film.

Although the strippable paint of the present invention is in the nonaqueous dispersion type, formation of the coating film can be made similarly to that in paints of the aqueous dispersion type. Specifically, as the solvent evaporates into the atmospheric air after the strippable paint is coated, the resin particles approach each other and finally adhere to each other thereby forming the coating film. At this time, free carboxyl group bonded to the main chain of the resin or acrylic copolymer provides a high acid value to the coating film of the strippable paint which is coated on the real or permanent paint, in which carboxyl group forms strong hydrogen bond with hydroxy group (—OH), thereby providing a good adhesion of the strippable paint to the real or permanent paint.

However, in case that adhesion of the resin particles is insufficient, deficiencies such as degraded gloss of the coating film, cracking of the coating film during drying of the strippable paint and coating film defect upon time lapse will arise. In view of this, in the strippable paint according to the present invention, diethylene glycol monoether(s) is contained in an amount ranging from 7 to 13% by weight relative to a resinous solid content (or coating film component) of the resinous liquid. The diethylene glycol nomoether(s) serve as the film forming assistant and function to prevent cracking of the coating film and improve the external appearance and durability of the coating film of the strippable paint. Examples of such diethylene glycol monoethers are diethylene glycol monobutylether, diethylene glycol monoethylether, diethylene glycol nonoisobutyl ether, diethylene glycol monoisopropylether, and the like. Such diethylene glycol monoethers are used singly or in combination, as the film forming assistant. The content of the diethylene glycol monoether(s) within the range of from 7 to 13% by weight is selected for the following reasons: If the content is less than 7% by weight, the above-mentioned effects of the film forming assistant cannot be obtained. If the content exceeds 13% by weight, acrylic copolymer resin particle for forming the coating film will unavoidably dissolve.

Polyether-chemically modified polysiloxane compound (polysiloxane compound or polymer chemically modified by polyether) is contained in the strippable paint according to the present invention and serves as the slipping agent. The slipping agent provides a slippery characteristics to the surface of the coating film thereby preventing formation of scratch at the coating film surface during car-washing and facilitating removal of water droplet trace upon car standing in outdoor. This polyether-chemically modified polysiloxane compound is contained in the range of from 0.5 to 2% by weight relative to the resin solid content of the resinous liquid. This content ranging from 0.5 to 2% by weight is selected for the following reasons: If the content is less than 0.5% by weight, the above-mentioned effects of the slipping agent cannot be obtained. If the content exceeds 2% by weight, a water resistance of the coating film of the strippable paint will degrade.

In case that the strippable paint contains no pigment and is clear and transparent, pigment may be contained in an amount ranging from 2 to 20% by weight thereby obtaining the strippable paint which has a variety of colors. This can cope with temporary remodeling of car. The content of the pigment ranging from 2 to 20% by weight is selected depending on the kinds of colors as set forth below. That is, for example, if the pigment (carbon black) content is less than 2% by weight for the black strippable paint, the hiding power of the paint is insufficient to cover the real or permanent paint. On the other hand, if the pigment (titanium dioxide white) content is over 20% by weight for the white strippable paint, the physical properties of the paint film will degrade to a useless level while giving a poor appearance to the paint film. Further, mica flake or powder and/or aluminum flake or powder may be contained in the strippable paint so as to obtain a pearl color finish and a metallic color finish.

The strippable paint is spayed to be coated by using a spray gun. The spray gun is, for example, a low pressure atomization spray gun having a nozzle opening size ranging from 1.3 to 1.5 mm. With such a spray gun, one or two spray-coating operations for the strippable paint are made under an air pressure ranging from 1.5 to 2.5 kg/cm$^2$ so as to complete formation of the coating film of the strippable paint. Additionally, the strippable paint is sprayed by using a handy airless spray such as a handy painter produced by Wagner Co., Ltd. in Germany, in which one or two spray-coating operations for the strippable paint are made to complete formation of the coating film. Furthermore, the strippable paint may be coated by using an aerosol spray so as to cope with small-size use (such as domestic use) of the strippable paint. Thus, anyone can easily make coating of the strippable paint.

In such coating of the strippable paint, there arises so-called fog at a part where double coat is made under spray gun strokes, and around the part. The fog is a phenomena in which gloss of the coating film is lost when mist of the strippable paint is scattered and adhered in its partially dried state onto the coating film of the strippable paint which has been already coated. This fog may make ununiform the external appearance of the coating film. In order to prevent the above, a surface regulating agent for the coating film of the strippable paint may be sprayed onto a portion where the fog arises, by using the airless spray gun or the like. This flattens or smoothens the surface of the coating film thus solving the problem of the fog. The surface regulating agent is formed of organic solvent containing diacetone alcohol as the main component. The surface regulating agent preferably remains for a certain time on the surface of the coating film without evaporating in order that the surface regulating effect is sustained.

Accordingly, an organic solvent having a relatively high boiling point and difficult to evaporate is selected as the surface regulating agent. The surface regulating agent contains not less than 90% by weight of diacetone alcohol, in which the remainder may be other organic solvents which are not limited to particular ones. A variety of organic solvents such as alcohol(s) and/or cellosolve(s) may be used as the remainder. In this connection, if the content of diacetone alcohol is less than 90% by weight, the surface regulating agent cannot exhibit a sufficient surface regulating effect.

The strippable paint is coated as discussed above to form the coating film thereof, in which the above-mentioned surface regulating agent is applied for the strippable paint if necessary. The thus formed coating film of the strippable paint serves as a temporary protective paint. After the roll of the temporary protective paint is finished, the strippable paint can be effectively removed by a release agent in such a manner that carboxyl group contained in the coating film of the strippable paint forms water-soluble polymer alkali soap under the action of alkali compound in the release agent, so that the coating film of the strippable paint can be easily released and removed by washing away with water. An example of the release agent is an aqueous solution in which 2 to 5% by weight of sodium metasilicate and 1 to 3% by weight of hydroxyethyl cellulose are contained in water.

Sodium metasilicate is a relatively weak alkaline inorganic compound and functions to form the water-soluble polymer alkali soap upon reaction with the carboxyl group contained in the coating film of the strippable paint thereby facilitating release and removal of the coating film of the strippable paint by the water-washing as discussed above. In this connection, if the content of sodium metasilicate is less than 2% by weight, a good releasable ability of the strippable paint cannot be obtained. If the content exceeds 5% by weight, pH of the rising water becomes too high to be drained as it is. A variety of hydrates of sodium metasilicate are known; however, sodium metasilicate nonahydrate is preferable to be used because of a good solubility to water and a high availability.

Hydroxyethyl cellulose serves as a thickener and a water holding agent, and functions to regulate the viscosity of the release agent at a suitable level thereby preventing the release agent from scattering and entering operator's eye and mouth, preventing the release agent coated on a vertical surface from readily flowing down, and providing a sufficient water content in the strippable paint while maintaining a sufficient thickness of the strippable paint until the strippable paint becomes water-soluble. Such effects cannot be obtained if the content of hydroxyethyl cellulose is less than 1% by weight. If the content exceeds 3% by weight, the release agent is gelled so that the sprayability and paintability of the release agent are degraded. The release agent may contain a surface active agent, an antiseptic agent and/or the like.

Such a release agent can be sprayed by using, for example, the above-mentioned handy painter which is a spray gun for high viscosity paint. After lapse of about 10 minutes from spraying of the release agent on the strippable paint, the strippable paint released from the surface of the coating film of the real or permanent paint is washed away together with the remaining release agent with pressurized water discharged from a pressurized-water car-washing machine or the like. In case that the coating film of the strippable paint partly remains without being removed, the release agent is again applied to the remaining coating film, and then water-washing is made on the remaining coating film. Sodium metasilicate contained in the release agent is widely used as a builder of domestic detergents and therefore is not problematic even though waste water after washing is drained as it is without being treated.

The strippable paint according to the present invention is used for temporarily protect, for example, the coated surface and resinous surface of automotive vehicles, domestic electric devices or electrified products, sporting goods, and the metal-plating surface and chemically treated surface of a metal part or member. Therefore, the strippable paint basically serves as a temporarily protective paint on the assumption that it is released and removed. It is to be noted that, however, the strippable paint according to the present invention has a painted external appearance similar to that of normal paints and is excellent in coating film performance and high in durability, so that the strippable paint cannot be readily removed as far as the release agent is not applied. Accordingly, the strippable paint can be utilized to repair damage due to jumping-up stone during use of the automotive vehicle, thereby improving the fine external appearance of the automotive vehicle. Additionally, applying the strippable paint to a new car can prevent damage of a paint coating surface due to snow fall during a snow-fall season, thereby solving such problematic phenomena that new car purchasing before a snow fall season is avoided in a snowy and cold area so that orders for new car purchasing are concentrated in a spring season after the snow fall season, thus making it possible to average the amount of orders received throughout a year.

As appreciated from the above, the strippable paint according to the present invention comprises the nonaqueous dispersion type resinous liquid which is prepared by dissolving the acrylic copolymer resin particle having specified acid value and glass transition temperature in the low aromatic hydrocarbon content solvent having a relatively low dissolving ability. The acrylic copolymer resin particle has been produced by introducing acrylic acid monomer and/or methacrylic acid monomer in the chain structure of the acrylic copolymer. Additionally, diethylene glycol monoether(s) serving as the film forming assistant and polyether-chemically modified polysiloxane compound serving as the slipping agent are contained in the nonaqueous dispersion type resinous liquid respectively in specified amounts.

Accordingly, the strippable paint is excellent in painted external appearance, painted coating film performance and durability. Additionally, the strippable paint can be easily released and removed from the real or permanent paint by using the release agent having a specified composition. The strippable paint exhibits highly excellent effects, for example, when applied as the temporary protective paint for a painted surface of an automotive vehicle. Furthermore, the strippable paint preferably contains 2 to 20% by weight of the pigment, so that it can be widely employed for the temporary color change, marking and the like while facilitating design change.

EXPERIMENT 1

The present invention will be more readily understood with reference to the following examples in comparison with comparative examples; however, these examples are intended to illustrate the invention and are not to be construed to limit the scope of the invention.

EXAMPLES 1–4 and

Comparative Examples 1–16

Strippable paints of Examples 1 to 4 and Comparative Examples 1 to 16 were prepared as follows: An acrylic copolymer resin particle was formed of acrylic copolymer constituting of ethyl methacrylate, butyl methacrylate, ethyl acrylate and butyl acrylate. The acrylic copolymer selectively contained 15% by weight of methacrylic acid monomer or acrylic acid monomer as shown in Tables 1 and 2. The acrylic polymer resin particle was dissolved in a low aromatic hydrocarbon content solvent which had been prepared by mixing "Solveso 100 (the trade name of Shell Japan Co., Ltd.) and "LAWS Mineral Spirit (the trade name of Shell Japan Co., Ltd.)", thereby forming a nonaqueous dispersion type resinous liquid in which the acrylic polymer resin particle was contained in an amount of 26% by weight relative to the nonaqueous dispersion type resinous liquid. Then, diethylene glycol monobutylether or diethylene glycol monoethylether was selectively added as a film forming assistant into the nonaqueous dispersion type resinous liquid in an amount (% by weight) shown in Table 1 relative to (the resinous solid content of) the nonaqueous dispersion type resinous liquid. Additionally, butyl cellosolve, benzyl alcohol and "Texanol (the trade name of Eastman Chemical Co., Ltd.)" were selectively added into the nonaqueous dispersion type resinous liquid in an amount (% by weight) shown in Tables 1 and 2 relative to (the resinous solid content of the nonaqueous dispersion type resinous liquid (none was added in Examples). Furthermore, "BYK-301(the trade name of BYK Chemie Co., Ltd.)" or "Paintad Q (the trade name of Dawcorning Co., Ltd.)" was selectively added as a slipping agent into the nonaqueous dispersion type resinous liquid in an amount (% by weight) shown in Tables 1 and 2 relative to the resin solid content of the nonaqueous dispersion type resinous liquid. The "BYK-301" was polyether-chemically modified dimethyl polysiloxane polymer. The "Paintad Q" was polysiloxane of pure silicone.

In the above preparation of the strippable paints, glass transition temperature (° C.) and acid value of the acrylic copolymer resin particle were regulated by changing a blending ratio among ethyl methacrylate, butyl methacrylate, ethyl acrylate and butyl acrylate. Additionally, a blending ratio between "Solveso 100" and "LAWS Mineral Spirit" was 14:86 in order to regulate the aniline point of the low aromatic hydrocarbon content solvent at a level of 40° C.

The thus prepared 20 kinds of the strippable paints were subjected to a variety of tests to evaluate coating film performance, removal characteristics for water droplet and slipping characteristics of the coating film of the strippable paints. The results of the tests are shown in Table 3.

Cracking Resistance of Coating Film

First, a tinned steel plate having a size of 0.3×50×70 mm was polished with a sand paper (No. 400) and degreased with a solvent. Each strippable paint was coated on the tinned steel plate to have a coating film thickness ranging from 15 to 20 $\mu$m and dried for a time (drying time) not longer than 30 minutes, and thereafter is allowed to stand at a temperature of 25° C. in a thermostatic oven. Then, evaluation of cracking resistance of the coating film was made or the strippable paint to obtain the results shown in Table 3, in which "A" indicates that no crack was formed in the coating film; "B" indicates that crack was formed at an edge section of the coating film; and "C" indicates that crack was formed throughout the whole coating film.

Gloss of Coating Film

A black amino-acrylic resin paint was coated on a plate to have a coating film thickness ranging from 25 to 30 $\mu$m, and then was subjected to baking to be dried at a temperature of 150° C. for a time of 20 minutes. Subsequently, each strippable paint was coated on the coating film of the black amino-acrylic resin paint to have a coating film thickness ranging from 15 to 20$\mu$m and dried for a time (drying time) not longer than 30 minutes, and thereafter was allowed to stand at a temperature of 25° C. for a time of 24 hours in a thermostatic oven. Then, the strippable paint was subjected to a gloss measurement according to JIS (Japanese Industrial Standard) K 5400 in which gloss under reflection at an angle of 60° was measured. Evaluation of gloss of the coating film was made for the strippable paint to obtain the results shown in Table 3, in which "A" indicates that the coating film had a gloss of not lower than 80; "B" indicates that the coating film had a gloss ranging from 60 to 70; and "C" indicates that the coating film had a gloss of not higher than 60.

Water Resistance

The black amino-acrylic resin paint was coated on a plate to have a coating film thickness ranging from 25 to 30 $\mu$m, and then was subjected to baking to be dried at a temperature of 150° C. for a time of 20 minutes. Subsequently, each strippable paint was coated on the coating film of the black amino-acrylic resin paint to have a coating film thickness ranging from 15 to 20 $\mu$m, and thereafter was allowed to stand at 25 ° C. for 72 hours in a thermostatic oven. Then, the painted plate was dipped in water at ordinary temperature for 24 hours. After the painted plate was drawn out from water, the surface of the coating film of the strippable paint was observed to evaluate water resistance of the coating film of the strippable paint thereby to obtain the results shown in Table 3, in which "A" indicates that no change was made in the coating film; "B" indicates that slight chalking was made in the coating film; and "C" indicates that chalking was made throughout the whole coating film.

Heat Cycle Resistance

Each strippable paint was prepared similarly to the above and subjected to a heat cycle test in which a heat cycle (cooling of −20° C., the hour and heating of 50° C., 1 hour) was repeated 10 times. After the heat cycle test, the surface of the coating film of the strippable paint was observed to evaluate a heat cycle resistance of the coating film of the strippable paint thereby to obtain the results shown in Table 3, in which "A" indicates that no change was made in the coating film; and "C" indicates that releasing and deterioration of the coating film had been found.

Removal Characteristics for Water Droplet Trace and Slipping Characteristics of Coating Film The black amino-acrylic resin paint was coated on a plate to have a coating film thickness ranging from 25 to 30 $\mu$m, and then was subjected to baking to be dried. Subsequently, each strippable paint was coated on the coating film of the black amino-acrylic resin paint to have a coating film thickness ranging from 15 to 20 $\mu$m, and thereafter was allowed to stand at a temperature of 25° C. for a time of 24 hours in a thermostatic oven. Then, a water droplet was dripped on the surface of the coating film of the strippable paint of the painted plate, upon which the water droplet was evaporated to leave the trace of the water droplet. Thereafter, the trace of the water droplet was wiped off with a gauze. The trace of the water droplet left on the surface of the coating film of the strippable paint was observed to evaluate a removal characteristics for water droplet trace on the coating film of the strippable paint thereby obtaining the results shown in Table 3, in which "A" indicates that the water droplet trace could be completely removed; "B" indicates that the water droplet trace was slightly left; and "C" indicates that the water droplet trace could hardly removed. It will be understood that evaluation of a slipping characteristics of coating film corresponds to the evaluation of the removal characteristics for water droplet trace, as shown in Table 3.

As apparent from the test results in Table 3, concerning the strippable paints of the comparative examples, they are generally inferior in the cracking resistance, heat cycle resistance and particularly gloss of the coating film although improved effects of the cracking resistance are recognized with the strippable paint of the comparative examples 7, 9 and 11 in which butyl cellosolve, benzyl alcohol or "Texanol" which is usually used as a film forming assistant in conventional aqueous dispersion type paints is increased in blended amount or content. Such a film forming assistant was used also in the comparative examples 6, 8 and 10. No such a film forming assistant is used in the comparative examples 1 to 5. It is confirmed that the water resistance of the coating film is inferior in the comparative example 1 in which the acrylic copolymer resin particle having a glass transition temperature of about 20° C. is used.

Further, it has been revealed that the water droplet trace cannot be removed or is difficult to be removed from the surface of the coating film in the comparative examples 12 to 14 in which no slipping agent was added and in the comparative example 15 in which a less amount of the slipping agent is added. Although a relatively good removal characteristics for water droplet trace is recognized in the comparative example 16 in which "paintad Q (polysiloxane of pure silicone)" was used as the slipping agent, it has been recognized that a baneful effect of repelling paint was found at a section to which paint mist is adhered. This reveals that addition of such a slipping agent is not desirable for the strippable paints of the present invention.

However, it has been confirmed that the strippable paints of the examples 1 to 4 are excellent in the coating film performance including the gloss of coating film, the removal characteristics for water droplet trace and the slipping characteristics of coating film. The strippable paints of the examples 1 to 4 were produced by adding diethylene glycol monobutylether or diethylene glycol monoethylether as the film forming assistant and "BYK-301 (polyether-chemically modified dimethyl polysiloxane polymer)" as the slipping agent into the nonaqueous dispersion type liquid which is prepared by dispersing the acrylic copolymer resin particle having the glass transition temperature of 25 to 30° C. into the low aromatic hydrocarbon content solvent.

Table 4 shows test results obtained by conducting a variety of durability tests and protection performance tests on the strippable paints of the examples 3 and 4. In these tests, each of the strippable paints was coated on the surface of the coating film of a real or permanent paint which had been already coated on a body of an automotive vehicle. The durability test for evaluating the durability performance included (a) an accelerated weathering test which was carried out for 1000 hours by using a Q-Ultra-Violet-Tester (produced by Q-Panel Company), a heat cycle test which was conducted by repeating 10 times (cycles) a cycle of cooling at −20° C. and heating at 50° C., a water droplet trace removal test which was carried out by wiping off a water droplet trace (formed on the surface of the coating film of the strippable paint) with a cloth, and a releasable ability of the strippable paint after lapse of not less than two years by using the release agent, as shown in Table 4. The tests for evaluating the protection performance included tests for observing the state of scratches made by actual removal of snow from the coating film surface of the strippable point and by making actual war washing on the coating film surface of the strippable paint, a test for observing the trace of iron power put on the coating film surface of the strippable paint, tests for observing as to whether the coating film surface of the strippable paints were affected or damaged by volcanic ash, bird droppings, sap, insects, pollen and acid rain. The test results are shown in Table 4 and reveal that the strippable paints of the examples 3 and 4 can generally meet the durability performance and protection performance required for usual automotive paint materials while being readily releasable and removable from the coating film of the real or permanent paint even upon lapse of years by using the release agent having the above specified composition.

EXPERIMENT 2

A sample of this Experiment 2 was composed of 13.5% by weight of a white pigment (rutile type titanium dioxide white), 23.5% by weight of an acrylic copolymer resin particle same as that of the above-mentioned example 4 shown in Table 1, 3.0% by weight of diethylene glycol monobutylether (12.8% by weight relative to the resinous solid content) as the film forming assistant, and 0.2% by weight of "BYK-301 (polyether-chemically modified dimethyl polysiloxane polymer)" (0.9% by weight relative to the resinous solid content) as the slipping agent, 8.6% by weight of "Solveso 100", and 51.2% by weight of "LAWS Mineral Spirit", "Solveso 100" and "LAWS Mineral Spirit" forming a low aromatic hydrocarbon content solvent having an aniline point of about 40° C. Thus, the strippable paint of the Experiment 2 contained the pigment so as to be colored.

Such a strippable paint was prepared as follows: First, the rutile type titanium white as the pigment, the acrylic copolymer resin particle, and 7.6% by weight of "Solveso 100" and 47.0% by weight of "LAWS Mineral Spirit" of the low aromatic hydrocarbon solvent were charged into a porcelain ball mill. Then, the thus charged ball mill was operated for 24 hours, in which the acrylic copolymer resin particle and particle of the pigment were dispersed in the solvent. Thereafter, the content of the ball mill was taken out, upon which the reminder of the solvent was supplied into the ball mill thereby washing out the remaining matter to be added to the taken-out content. The film forming assistant and the slipping agent were added to the taken-out content thus obtaining the colored strippable paint. This strippable paint had a suitable thixotropy so as to stabilize dispersion of the pigment. The porcelain ball mill was selected taking account of preventing the stability of the paint from being affected upon application of high shearing force and heat onto the nonaqueous dispersion type resinous liquid.

The thus prepared colored strippable paint was subjected to the gloss measurement according to JIS K 5400 in which gloss under reflection at an angle of 60° was measured. As a result of this measurement, the gloss is ranged from about 50 to about 60, and therefore it is confirmed that, in practice, a finish coat of the clear or transparent strippable paint is preferably made on the colored strippable paint. It will be understood that the pigment is not limited to white pigment, and therefore pigments having a variety of colors may be used for the strippable paint of the present invention. Accordingly, the strippable paints colored with the pigments may be used to cope with temporary color change of an article coated with a real or permanent paint, or used for a variety of markings. In this connection, since the base resin of the acrylic copolymer resin particle of the strippable paint is acidic, it is preferable to select the pigment for the strippable paint except for basic pigments.

EXPERIMENT 3

This experiment was carried out to make evaluation of a variety of surface regulating agents for dissolving so-called "fog (shaded gloss)" in the coating film of the strippable paint so as to restore the gloss. The surface regulating agents were selected from diacetone alcohol, butyl cellosolve, benzyl alcohol and/or "Texanol" and mixed in blended amounts or contents (% by weight) shown in Table 6, thereby preparing the surface regulating agents of Examples 1 to 4 and Comparative Examples 1 to 8. The thus prepared surface regulating agents were subjected to a coating test discussed below.

A black amino-acrylic resin paint was coated on a steel plate having a size of 0.8×70×150 mm to have a coating film thickness ranging from 25 to 30 $\mu$m, and then was subjected to baking to be dried at a temperature of 150° C. for a time of 20 minutes, thereby preparing a painted steel plate. Thereafter, a strippable paint of example 4 in Table 1 was coated on the coating film of the black amino-acrylic resin paint to have a coating film thickness ranging from 10 to 15 $\mu$m. Under a condition where the strippable paint had not still been dried, paint mist of the strippable paint was sprayed onto the coating film of the strippable paint by narrowing the nozzle opening of a spray gun, thereby forming the shaded gloss state or "fog" at the coating film of the strippable paint. Subsequently, after the painted steel plate was allowed to stand at room temperature for a time of 5 minutes, each of the surface regulating agents of Examples and Comparative Examples shown in Table 6 was coated on a part where the "fog" was formed, by making one coating stroke of the spray gun. Then, the coated surface regulating agent was allowed to stand at room temperature for a time of 30 minutes. At this time, the external appearance of the coating film of the strippable paint was evaluated by visual observation. The results of such observation are shown in Table 6, in which "A" indicates formation of a good coating film upon the "fog" being completely disappeared; "B" indicates a state where a part of the "fog" is left without being disappeared; and "C" indicates a state where no "fog" is disappeared.

As a result of the above experiment, the followings have been confirmed: The high boiling point solvents other than diacetone alcohol exhibit no surface regulating effect for the strippable paint when they are used singly. In case that the content of diacetone alcohol is not larger than 80% by weight, the surface regulating effect is degraded. In contrast, high surface regulating effects are exhibited by the surface regulating agents of examples 1 to 4 in which not less than 90% by weight of diacetone alcohol is contained.

EXPERIMENT 4

This experiment was carried out to make evaluation of a variety of release agents for releasing and removing the coating film of the strippable paint. Sodium metasilicate, diethanol amine and triethanol amine were selected as the release agent from alkaline compounds exhibiting a relatively moderate action, and then dissolved together with hydroxyethyl cellulose serving as a thickener and a water-holding agent into water thereby preparing the release agents of examples 1 to 3 and comparative examples 1 to 11, the contents (% by weight) of the above agents being shown in Table 7. The above-mentioned sodium metasilicate was used or blended as the state of sodium metasilicate nonahydrate, in which the concentration or content as sodium metasilicate was shown within ( ) in Table 7. Additionally, 0.2% by weight of "Syfinol PSA-204 (the trade name of Dai-ichi Kogyou Seiyaku Co., Ltd.) and 0.1% by weight of "Proxcel XL-2 (the trade name of Avecia Co., Ltd.)" were contained in the release agents. The "Syfinol PSA-204 was a low foamability surface active agent formed of a mixture whose main component was acetylenic diol, and used for improving conformability of the release agent with the coating film of the strippable agent and for accelerating reaction. The "Proxcel XL-2" was an antiseptic agent whose main component was hexahydrotriazine. The thus prepared release agents were subjected to a coating test discussed below.

Similarly to the coating test for the surface regulating agents, a black amino-acrylic resin paint was coated on a steel plate having a size of 0.8×70×150 mm to have a coating film thickness ranging from 25 to 30 $\mu$m, and then was subjected to baking to be dried at a temperature of 150° C. for a time of 20 minutes, thereby preparing a painted steel plate. Thereafter, a strippable paint of example 4 in Table 1 was coated on the coating film of the black amino-acrylic resin paint to have a coating film thickness ranging from 10 to 15 $\mu$m and dried at room temperature for 1 hour. The dried painted steel plate coated with the strippable paint was subjected to an accelerated drying at a temperature of 50° C. for a time of 5 hours, thereby preparing a test piece for each strippable paint to be subjected to the coating test of the release agents. Then, each of the release agents of Examples and Comparative Examples was flow-coated on the surface of the test piece which had been supported vertical. After the test piece coated with the release agent was allowed to stand at room temperature for a time of 10 minutes, the test piece was washed with water. At this time, the release and removal state of the coating film of the strippable paint was visually observed. The results of such observation are shown in Table 7, in which "AA" indicates that the strippable paint can be completely removed without remaining its trace; "A" indicates that the trace of the strippable paint remains at only a part of the surface of the painted steel plate; "B" indicates that the considerable traces of the strippable paint remain at the surface of the painted steel plate; and "C" indicates that the traces of the strippable paint remain at the whole surface of the painted steel plate so that the strippable paint is hardly removed.

As a result of the above experiment, the followings have been confirmed: A release action or effect for the strippable paint was weak with the release agents of the comparative example 1 in which the content of sodium metasilicate is low and of the comparative examples 3 to 11 in which alkanolamines such as diethanol amine and/or triethanol amine were contained. The strippable paint could be hardly released particularly with the release agents of comparative examples 8 to 11 in which triethanol amine is contained. The release agent of comparative example 2 is insufficient in viscosity and water-holding ability, and therefore the release agent unavoidably flows down along the surface of the coating film of the strippable paint within a short time so as not to exhibit a sufficient release effect for the strippable paint though it contains a sufficient amount of sodium metasilicate.

In contrast, a good release action or effect for the strippable paint can be obtained with the release agents of the examples 1 to 3 in which an appropriate amount of sodium metasilicate is contained together with hydroxyethyl cellulose. Particularly, an excellent release action or effect is obtained with the release agent of the example 3 in which 10% by weight of sodium metasilicate nonahydrate (4.3% by weight of sodium metasilicate) is contained.

Sodium metasilicate is usually contained in an amount ranging from about 20 to 25% in domestic detergents as a builder as discussed above, so that safety in drain of waste water has been ensured. This was confirmed by the following test: The release agent of the example 3 shown in Table 7 was coated on the coating film of the strippable film according to the present invention to have a thickness or amount of about 100 g/m². Thereafter, water-washing was made on the coating film of the strippable paint. The waste water of the rising-water had a pH ranging from 8 to 7, a BOD (biochemical oxygen demand) of 83.7 mg/liter, and a COD (chemical oxygen demand) of 22.0 mg/liter. These BOD and COD are sufficiently low as compared with a general regulation value of 600 mg/liter, and therefore it is confirmed that a special treatment facility for the waste water is not required.

The entire contents of Japanese Patent Applications P11-053146 (filed Mar. 1, 1999) are incorporated herein by reference.

Although the invention has been described above by reference to certain embodiments (examples) of the invention, the invention is not limited to the embodiments described above. Modifications and variations of the embodiments described above will occur to those skilled in the art, in light of the above teachings. The scope of the invention is defined with reference to the following claims.

TABLE 1

| Raw materials | | | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Acrylic copolymer resin particle | Component (%) | Methacrylic acid monomer 15% | 26 | 26 | — | 26 | 26 | 26 | 26 | 26 | 26 | 26 | 26 |
| | | Acrylic acid monomer 15% | — | — | 26 | — | — | — | — | — | — | — | — |
| | Glass transition temp. (° C.) | | 30 | 30 | 25 | 30 | 20 | 25 | 30 | 35 | 40 | 30 | 30 |
| | Acid value | | 100.5 | 101.3 | 98.9 | 100.1 | 98.2 | 97.3 | 101.6 | 100.3 | 95.9 | 97.8 | 99.4 |
| Low aromatic HC content | Solveso 100 (%) | | 9.9 | 9.9 | 9.9 | 9.9 | 10.4 | 10.4 | 10.4 | 10.4 | 10.4 | 10.2 | 9.9 |
| | LAWS Mineral Spirit (%) | | 61.1 | 61.1 | 60.9 | 60.9 | 63.6 | 63.6 | 63.6 | 63.6 | 63.6 | 62.8 | 61.1 |
| Film forming assistant (%) | Diehylene glycol monobutylether (%) | | 3 (11.5) | — | 3 (11.5) | 3 (11.5) | — | — | — | — | — | — | — |
| | Diehylene glycol monoethylether (%) | | — | 3 (11.5) | — | (11.5) | (11.5) | — | — | — | — | — | — |
| | Butyl cellosolve (%) | | — | — | — | — | — | — | — | — | — | 1 (3.8) | 3 (11.5) |
| | Benzyl alcohol (%) | | — | — | — | — | — | — | — | — | — | — | — |
| | Texanol (%) | | — | — | — | — | — | — | — | — | — | — | — |
| Slipping agent | BYK-301 (%) | | 0.3 (1.2) | 0.3 (1.2) | 0.2 (0.8) | 0.2 (0.8) | — | — | — | — | — | — | — |
| | Paintad Q (%) | | — | — | — | — | — | — | — | — | — | — | — |

Note: ( ) indicates wt % relative to solid content.

TABLE 2

| Raw Materials | | | Comparetive Example 8 | 9 | 10 | 11 | 12 | 13 | 14 | 15 | 16 |
|---|---|---|---|---|---|---|---|---|---|---|---|
| Acrylic copolymer resin particle | Component (%) | Methacrylic acid monomer 15% | 26 | 26 | 26 | 26 | 26 | 26 | 26 | 26 | 26 |
| | | Acrylic acid monomer 15% | — | — | — | — | — | — | — | — | — |
| | Glass transition temp (° C.) | | 30 | 30 | 30 | 30 | 30 | 30 | 30 | 30 | 30 |
| | Acid value | | 101.5 | 100.2 | 98.7 | 97.6 | 101.8 | 101.8 | 100.8 | 100.7 | 99.6 |
| Low aromatic HC content | Solveso 100 (%) | | 10.2 | 9.9 | 10.2 | 9.9 | 10.2 | 9.9 | 9.9 | 9.9 | 9.9 |
| | LAWS Mineral Spirit (%) | | 62.8 | 61.1 | 62.8 | 61.1 | 62.8 | 61.1 | 61.1 | 61.1 | 61.1 |
| Film forming assistant (%) | Diehylene glycol monobutylether (%) | | — | — | — | — | 1 (3.8) | 3 (11.5) | — | 3 (11.5) | 3 (11.5) |
| | Diehylene glycol monoethylether (%) | | — | — | — | — | — | — | 3 (11.5) | — | — |
| | Butyl cellosolve (%) | | — | — | — | — | — | — | — | — | — |
| | Benzyl alcohol (%) | | 1 (3.8) | 3 (11.5) | — | — | — | — | — | — | — |
| | Texanol (%) | | — | — | 1 (3.8) | 3 (11.5) | — | — | — | — | — |
| Slipping agent | BYK-301 (%) | | — | — | — | — | — | — | — | 0.1 (0.4) | — |
| | Paintad Q (%) | | — | — | — | — | — | — | — | — | 0.2 (0.8) |

Note: ( ) indicates wt % relative to resionous solid content.

TABLE 3

| No. | | Cracking resistance of coating film | Drying time | Gloss of coating film | Water resistance | Heat cycle resistance | Removal characteristics for water droplet | Slipping characteristics of coating film |
|---|---|---|---|---|---|---|---|---|
| Example | 1 | A | Not longer than 30 min. | A | A | A | A | A |
| | 2 | A | Not longer than 30 min. | A | A | A | A | A |
| | 3 | A | Not longer than 30 min. | A | A | A | A | A |
| | 4 | A | Not longer than 30 min. | A | A | A | A | A |
| Comparative Example | 1 | B | Not longer than 30 min. | B~A | C | C | C | C |
| | 2 | C | Not longer than 30 min. | B | A | C | C | C |
| | 3 | C | Not longer than 30 min. | B | A | C | C | C |
| | 4 | C | Not longer than 30 min. | C | A | C | C | C |
| | 5 | C | Not longer than 30 min. | C | A | C | C | C |
| | 6 | C | Not longer than 30 min. | C | A | C | C | C |
| | 7 | A | Not longer than 30 min. | C | A | C | C | C |
| | 8 | B | Not longer than 30 min. | C | A | C | C | C |
| | 9 | A | Not longer than 30 min. | C | A | A | C | C |
| | 10 | C | Not longer than 30 min. | C | A | C | C | C |
| | 11 | A | Not longer than 30 min. | C | A | A | C | C |
| | 12 | A | Not longer than 30 min. | B | A | C | C | C |
| | 13 | A | Not longer than 30 min. | A | A | A | C | C |
| | 14 | A | Not longer than 30 min. | A | A | A | C | C |
| | 15 | A | Not longer than 30 min. | A | A | A | B | B |
| | 16 | A | Not longer than 30 min. | A | A | A | A | A |

TABLE 4

| | Test item | Test method | Test result |
|---|---|---|---|
| Durability performance | Accelerated weathering test | Q.U.V. accelerated weathering test (1000 hrs.) | Durable after lapse of not less than two years in outdoor |
| | Heat cycle test | $-20°$ C. $\Leftrightarrow$ $50°$ C. (10 cycles repeated) | Durable for not less than 10 cycles |
| | Water droplet trace removal test | Wiping off with cloth | Water droplet trace readily removed |
| | Releasable ability after lapse of years | Using release agent | Readily releasable after lapse of not less than two years in outdoor |
| Protection performance | Scratch upon snow removal | According to practical test | No abnormality |
| | Scratch upon car washing | According to practical test | No abnormality |
| | Iron powder trace | According to practical test | No abnormality |
| | Volcanic ash | According to practical test | No abnormality |
| | Bird droppings | Contact test with reagent | Protection ability exhibited |
| | Sap | Contact test with reagent | No abnormality |
| | Damage from insects | Contact test with reagent | No abnormality |
| | Pollen | Contact test with reagent | No abnormality |
| | Acid rain | Contact test with reagent | No abnormality |

TABLE 5

| Item | Raw materials | Blended amount (%) | |
|---|---|---|---|
| Pigment | Rutile type titanium dioxide white | 13.5 | |
| Acrylic copolymer resin particle | Same as Example 4 in Table 1 | 23.5 | |
| Low aromatic HC content solvent | Solveso 100 | 8.6 | |
| | LAWS Mineral Spirit | 51.2 | |
| Film forming assistant | Diethylene glycol monobutylether | 3.0 | (12.8) |
| Slipping agent | BYK-301 | 0.2 | (0.9) |
| | Total | 100.0 | |

Note: ( ) indicates wt % relative to resionous solid content.

TABLE 6

| No. | Raw material (wt %) | | | | | Performance of surface regulating agent (Restoration of gloss) |
| --- | --- | --- | --- | --- | --- | --- |
| | Diacetone alcohol | Butyl cellosolve | Benzyl alcohol | Texanol | Total | |
| Example 1 | 100 | — | — | — | 100 | A |
| Example 2 | 90 | 10 | — | — | 100 | A |
| Comparative Example 1 | 80 | 20 | — | — | 100 | B |
| Comparative Example 2 | 70 | 30 | — | — | 100 | C |
| Comparative Example 3 | — | — | 100 | — | 100 | C |
| Example 3 | 90 | — | 10 | — | 100 | A |
| Comparative Example 4 | 80 | — | 20 | — | 100 | B |
| Comparative Example 5 | 70 | — | 30 | — | 100 | C |
| Comparative Example 6 | — | — | — | 100 | 100 | C |
| Example 4 | 90 | — | — | 10 | 100 | A |
| Comparative Example 7 | 80 | — | — | 20 | 100 | C |
| Comparative Example 8 | 70 | — | — | 30 | 100 | C |

TABLE 7

| No. | Raw material (wt %) | | | | | | | | Releasable ability of coating film |
| --- | --- | --- | --- | --- | --- | --- | --- | --- | --- |
| | Sodium metasilicate nonahydrate* | Diethanolamine | Triethanolamine | Hydroxyethyl cellulose | Sylinol PSA-204 | Proxcel XL-2 | Water | Total | |
| Comparative Example 1 | 3 (1.3) | — | — | 2.5 | 0.2 | 0.1 | 94.2 | 100.0 | B |
| Example 1 | 5 (2.1) | — | — | 2.5 | 0.2 | 0.1 | 92.2 | 100.0 | B-A |
| Example 2 | 7.5 (3.2) | — | — | 2.5 | 0.2 | 0.1 | 89.7 | 100.0 | A |
| Example 3 | 10 (4.3) | — | — | 2.5 | 0.2 | 0.1 | 87.2 | 100.0 | AA |
| Comparative Example 2 | 10 (4.3) | — | — | — | 0.2 | 0.1 | 89.7 | 100.0 | C-B |
| Comparative Example 3 | — | 3 | — | 2.5 | 0.2 | 0.1 | 94.2 | 100.0 | C |
| Comparative Example 4 | — | 5 | — | 2.5 | 0.2 | 0.1 | 94.2 | 100.0 | C |
| Comparative Example 5 | — | 7.5 | — | 2.5 | 0.2 | 0.1 | 92.2 | 100.0 | B |
| Comparative Example 6 | — | 10 | — | 2.5 | 0.2 | 0.1 | 89.7 | 100.0 | B |
| Comparative Example 7 | — | 10 | — | — | 0.2 | 0.1 | 87.2 | 100.0 | B |
| Comparative Example 8 | — | — | 3 | 2.5 | 0.2 | 0.1 | 89.7 | 100.0 | C |
| Comparative Example 9 | — | — | 5 | 2.5 | 0.2 | 0.1 | 91.2 | 100.0 | C |
| Comparative Example 10 | — | — | 7.5 | 2.5 | 0.2 | 0.1 | 92.2 | 100.0 | C |
| Comparative Example 11 | — | — | 10 | 2.5 | 0.2 | 0.1 | 89.7 | 100.0 | C |

*Note : A concentration (wt %) of sodium metasilicate is shown within ( ).

What is claimed is:

1. A strippable paint comprising:
a nonaqueous dispersion type resinous liquid including a solvent containing aromatic hydrocarbon in an amount ranging from 30 to 45% by weight relative to said solvent, and acrylic copolymer resin particle dispersed in said solvent in an amount ranging from 20 to 30% by weight relative to said nonaqueous dispersion type resinous liquid, said acrylic copolymer resin particle being formed of acrylic copolymer having a chain structure including at least one of acrylic acid monomer and methacrylic acid monomer having ethylenic unsaturated bond and carboxyl group, said acrylic copolymer resin particle having an acid value of not lower than 90 and a glass transition temperature ranging from 25 to 40° C.;
diethylene glycol monoether contained in said nonaqueous dispersion type resinous liquid in an amount ranging from 7 to 13% by weight of a resinous solid content of said nonaqueous dispersion type resinous liquid; and
polyether-chemically modified polysiloxane compound contained in said nonaqueous dispersion type resinous liquid in an amount ranging from 0.5 to 2% by weight of the resin solid content of said nonaqueous dispersion type resinous liquid.

2. A strippable paint as claimed in claim 1, further comprising a pigment in an amount ranging from 2 to 20% by weight.

3. A surface regulating agent to be used in combination with a strippable paint including a nonaqueous dispersion type resinous liquid including a solvent containing aromatic hydrocarbon in an amount ranging from 30 to 45% by weight relative to said solvent, and acrylic copolymer resin particle dispersed in said solvent in an amount ranging from 20 to 30% by weight relative to said nonaqueous dispersion type resinous liquid, said acrylic copolymer resin particle being formed of acrylic copolymer having a chain structure including at least one of acrylic acid monomer and methacrylic acid monomer having ethylenic unsaturated bond and carboxyl group, said acrylic copolymer resin particle having an acid value of not lower than 90 and a glass transition temperature ranging from 25 to 40° C.; diethylene glycol monoether contained in said nonaqueous dispersion type resinous liquid in an amount ranging from 7 to 13% by weight of a resinous solid content of said nonaqueous dispersion type resinous liquid; and polyether-chemically modified polysiloxane compound contained in said nonaqueous dispersion type resinous liquid in an amount ranging from 0.5 to 2% by weight of the resin solid content of said nonaqueous dispersion type resinous liquid;

said surface regulating agent comprising diacetone alcohol in an amount of not less than 90% by weight.

4. A release agent to be used in combination with a nonaqueous dispersion type resinous liquid including a solvent containing aromatic hydrocarbon in an amount ranging from 30 to 45% by weight relative to said solvent, and acrylic copolymer resin particle dispersed in said solvent in an amount ranging from 20 to 30% by weight relative to said nonaqueous dispersion type resinous liquid, said acrylic copolymer resin particle being formed of acrylic copolymer having a chain structure including at least one of acrylic acid monomer and methacrylic acid monomer having ethylenic unsaturated bond and carboxyl group, said acrylic copolymer resin particle having an acid value of not lower than 90 and a glass transition temperature ranging from 25 to 40° C.; diethylene glycol monoether contained in said nonaqueous dispersion type resinous liquid in an amount ranging from 7 to 13% by weight of a resinous solid content of said nonaqueous dispersion type resinous liquid; and polyether-chemically modified polysiloxane compound contained in said nonaqueous dispersion type resinous liquid in an amount ranging from 0.5 to 2% by weight of the resin solid content of said nonaqueous dispersion type resinous liquid;

said release agent comprising water, sodium metasilicate in an amount ranging from 2 to 5% by weight, and hydroxyethyl cellulose in an amount of 1 to 3% by weight.

5. A release agent as claimed in claim 4, wherein said release agent comprising at least one of a surface active agent, and a antiseptic agent.

6. A method of temporarily protecting a surface of an article, comprising:

preparing a strippable paint including a nonaqueous dispersion type resinous liquid including a solvent containing aromatic hydrocarbon in an amount ranging from 30 to 45% by weight relative to said solvent, and acrylic copolymer resin particle dispersed in said solvent in an amount ranging from 20 to 30% by weight relative to said nonaqueous dispersion type resinous liquid, said acrylic copolymer resin particle being formed of acrylic copolymer having a chain structure including at least one of acrylic acid monomer and methacrylic acid monomer having ethylenic unsaturated bond and carboxyl group, said acrylic copolymer resin particle having an acid value of not lower than 90 and a glass transition temperature ranging from 25 to 40° C.; diethylene glycol monoether contained in said nonaqueous dispersion type resinous liquid in an amount ranging from 7 to 13% by weight of a resinous solid content of said nonaqueous dispersion type resinous liquid; and polyether-chemically modified polysiloxane compound contained in said nonaqueous dispersion type resinous liquid in an amount ranging from 0.5 to 2% by weight of the resin solid content of said nonaqueous dispersion type resinous liquid;

coating said strippable paint on the surface of the article for the purpose of temporarily protecting the surface of the article;

coating a release agent on the strippable paint coated on the surface of the article, said release agent including water, sodium metasilicate in an amount ranging from 2 to 5% by weight, and hydroxyethyl cellulose in an amount of 1 to 3% by weight; and washing away the strippable paint together with the release agent with water so as to expose the surface of the article.

\* \* \* \* \*

UNITED STATES PATENT AND TRADEMARK OFFICE
CERTIFICATE OF CORRECTION

PATENT NO.   : 6,284,826 B1
DATED        : September 4, 2001
INVENTOR(S)  : Keigo Kinoshita et al.

It is certified that error appears in the above-identified patent and that said Letters Patent is hereby corrected as shown below:

<u>Title page,</u>
Item [73], change the Assignee from "Nissan Motor Co. LTD, Kanagawa (JP)" to -- Nissan Motor Co., Ltd., Yokohama-shi (JP); Nagashima Special Paint Co., Ltd., Tokyo (JP); Matex Co., Ltd., Tokyo (JP) --.

Signed and Sealed this

Seventeenth Day of September, 2002

Attest:

JAMES E. ROGAN
*Attesting Officer*   *Director of the United States Patent and Trademark Office*